(12) United States Patent
Teramoto (10) Patent No.: US 6,288,849 B1
(45) Date of Patent: Sep. 11, 2001

(54) OPTICAL ELEMENT

(75) Inventor: Satoshi Teramoto, Kamiina-gun (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/439,782

(22) Filed: Nov. 12, 1999

(30) Foreign Application Priority Data

Nov. 12, 1998 (JP) .................................................. 10-322122
Jul. 23, 1999 (JP) .................................................. 11-209952

(51) Int. Cl.[7] ...................................................... G02B 3/02
(52) U.S. Cl. ............................................. 359/720; 359/642
(58) Field of Search .................................... 359/720, 708, 359/718, 642, 580–582; 264/1.7; 428/411.1

(56) References Cited

U.S. PATENT DOCUMENTS 4,657,354 * 4/1987 Kobayashi ............................ 359/718
5,400,182 * 3/1995 Chiba ................................... 359/718
5,566,027 * 10/1996 Saitoh et al. ........................ 359/796

FOREIGN PATENT DOCUMENTS 10-177105   6/1998 (JP) .

* cited by examiner

Primary Examiner—Jordan M. Schwartz
(74) Attorney, Agent, or Firm—Hogan & Hartson, LLP

(57) ABSTRACT

An optical element comprises a glass base having one surface and a resin layer formed on the one surface of the base. The glass base has an optical axis such that the one surface of the base has a contour asymmetrical in rotation about the optical axis. The resin layer extends within the one surface of the glass base and has a contour kept apart from fine chips at the contour of the one surface of the base. Preferably, the distance between the respective contours of the one surface of the glass base and the resin layer is longer than 0.3 mm, and the contour of the resin layer is substantially similar to the contour of the one surface of the base.

20 Claims, 5 Drawing Sheets

OPTICAL ELEMENT

BACKGROUND OF THE INVENTION

The present invention relates to a composite optical element comprising a glass base and a resin layer thereon, and more particularly, to a compact composite optical element adapted for use in a camera.

An optical element or lens used in a camera has a rectangular effective range for guiding light to a film according to the shape of a frame formed on the film. Based on this fact, a compact camera lens useful for camera is disclosed in Jpn. Pat. Appln. KOKAI Publication No. 10-177105. The compact lens is made by partially removing outside of the rectangular effective range from a conventional circular composite lens. The resulting lens has a shape asymmetrical in rotation about its central axis, that is, a noncircular shape. An additional space obtained by the removal can be utilized for the arrangement of other camera components.

The composite lens comprises a glass base and a resin layer thereon. The glass base and the resin layer are cut together as an unnecessary portion of the lens is eliminated for compactness. Cutting the glass base produces a large number of burrs or fine chips, from which fine cracks extend individually inward.

In general, resin has a thermal linear expansion coefficient higher than that of glass, so that resin is subject to a greater dimensional change with temperature than glass is. Thus, if the temperature of the lens which is composed of the glass base and the resin layer thereon changes, the resin layer undergoes a greater deformation than the glass base does, so that stress is generated between the two. For example, a simulation of the finite element method tells that the stress is the heaviest at an end portion of the resin layer.

A cut surface of the lens constitutes the end portion of the resin layer, where a large number of fine chips are formed on the glass base. Therefore, the fine chips are subjected to a relatively heavy stress. The stress sometimes enlarges the cracks that extend from the fine chips, thereby causing the glass base to be damaged. In such a case, the lens cannot serves as a useful component any longer.

BRIEF SUMMARY OF THE INVENTION

The present invention has been contrived in consideration of these circumstances and its object is to provide a noncircular composite optical element free from breakage that is attributable to temperature change.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will now be described in detail with reference to the accompanying drawings. In the description of the embodiments to follow, like elements are designated by like numerals for simplicity.

FIRST EMBODIMENT

Figure 1:
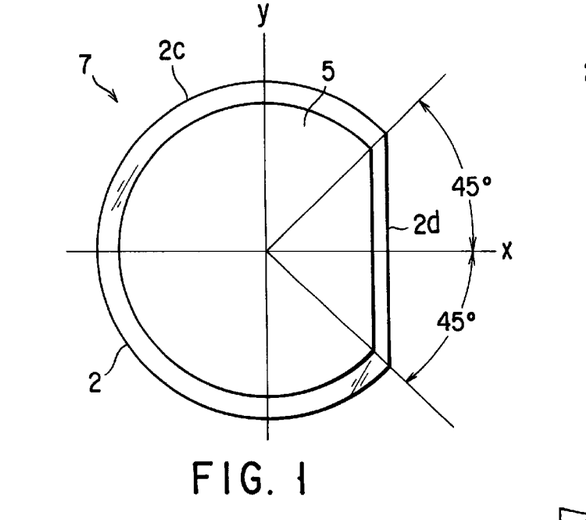
FIG. 1 is a plan view of an optical element according to a first embodiment, showing the respective contours of a shaped surface of a glass base and a resin layer.
Figure 2:
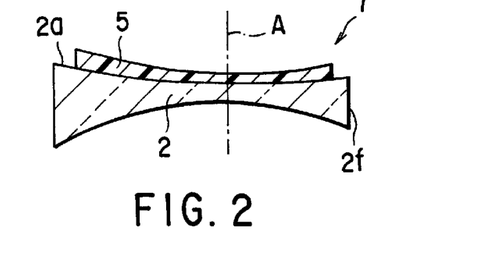
FIG. 2 is a side sectional view of the optical element of FIG. 1 taken along the x-axis.

As shown in FIGS. 1 and 2, an optical element 7 is a composite lens, for example, which comprises a glass base 2 having a pair of optical surfaces 2a and 2b and a resin layer 5 formed on the optical surface 2a of the base 2.

The glass base 2 has an optical axis A, and the optical surface 2a of the base 2 has a contour which is asymmetrical in rotation about the axis A, as seen from FIG. 1. In other words, the optical surface 2a has a noncircular contour. The optical axis, as used herein, refers to an imaginary straight line that passes through the respective centers of curvature of the two optical surfaces of the glass base.

Figure 3:
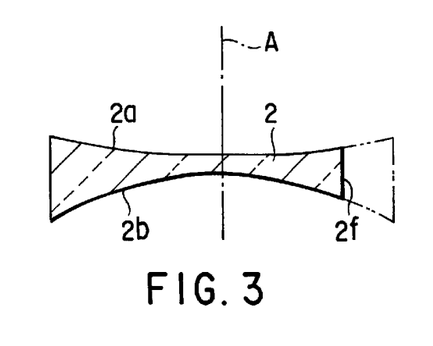
FIG. 3 is a side sectional view of a glass base simple shown in FIG. 2.

As seen from FIGS. 2 and 3, the optical surface 2a comprises a part of a concave surface, e.g., a spherical surface, with a curvature radius of, e.g., 100 mm. The surface 2a, herein, is referred to also as a shaped surface. Likewise, the optical surface 2b comprises a part of a concave surface, e.g., a spherical surface, with a curvature radius of, e.g., 50 mm. The surface 2b, herein, is referred to also as an unshaped surface. The glass base 2 has a center thickness of, e.g., 2 mm, that is, the distance between the concave surfaces 2a and 2b on the optical axis A is 2 mm.

As shown in FIG. 1, for example, the contour of the shaped surface 2a of the glass base 2 is defined by a superior arc 2c in a projection on an xy-plane perpendicular to the optical axis A and a chord 2d which connects the opposite ends of the arc 2c.

More specifically, the contour of the shaped surface 2a includes the superior arc 2c of 25-mm diameter, outside the upper and lower positive 45° regions with respect to the x-axis, and the chord 2d between the opposite ends of the arc 2c, inside the upper and lower positive 45° regions. The x-coordinate value for chord 2d is about 8.84 mm.

Figure 4:
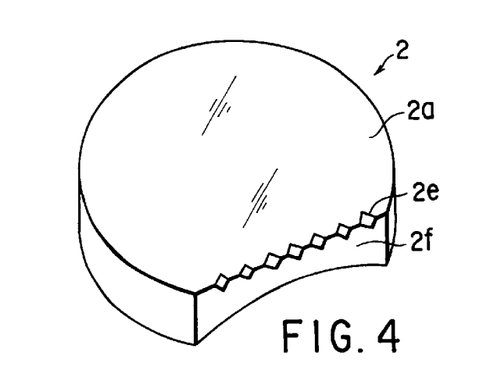
FIG. 4 is a perspective view of the glass base shown in FIG. 3.

The glass base 2 is made by cutting a part of a preformed glass material having a circular contour in the projection on the xy-plane perpendicular to the optical axis A. A cut portion is indicated by phantom line in FIG. 3. As shown in FIG. 4, therefore, the glass base 2 has innumerable fine chips 2e at its edge, on which a cut surface 2f and the shaped surface 2a meet each other. The circular preformed glass material is commercially available as "PBL28" manufactured by Ohara Co., Ltd.

Thus, the contour of the shaped surface 2a of the glass base 2 is defined by the original contour of the preformed glass material and the line of intersection between the corresponding surface of the preformed glass material and the cut surface 2f.

The resin layer 5 extends on and within the shaped surface 2a of the glass base 2. The layer 5 has a contour which is kept apart from the fine chips 2e produced at the contour of the shaped surface 2a. Preferably, the contour of the resin layer 5 is substantially similar to that of the shaped surface 2a of the glass base 2. The distance between the respective contours of the shaped surface 2a of the glass base 2 and the resin layer 5 is preferably longer than 0.3 mm, e.g., about 1.5 mm at the arc portion and about 1 mm at the chord portion. The resin layer 5 is formed of energy-curing resin, e.g., ultraviolet-curing resin. Suitable ultraviolet-curing resins include "MP-201" manufactured by Mitsubishi Rayon, Co., Ltd.

The following is a description of steps of procedure for manufacturing the optical element 7.

Figure 5:
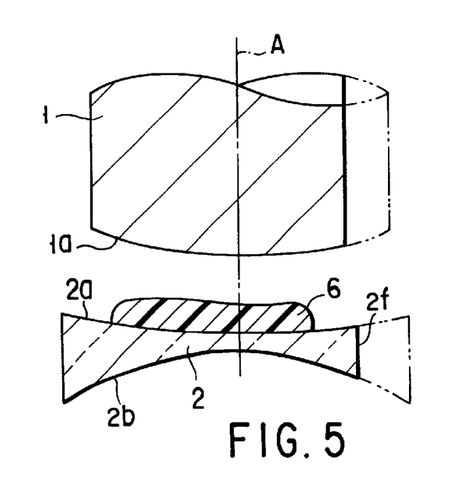
FIG. 5 is a partial side sectional view for illustrating a process for forming a resin layer on the glass base of FIG. 3 by means of a mold.

First, a mold 1 which is movable in the vertical direction of FIG. 5 is prepared. The mold 1 has a surface 1a that corresponds to the optical surface to be transferred to the resin layer 5. Here the surface 1a is referred to also as a resin pressing surface.

Figure 6:
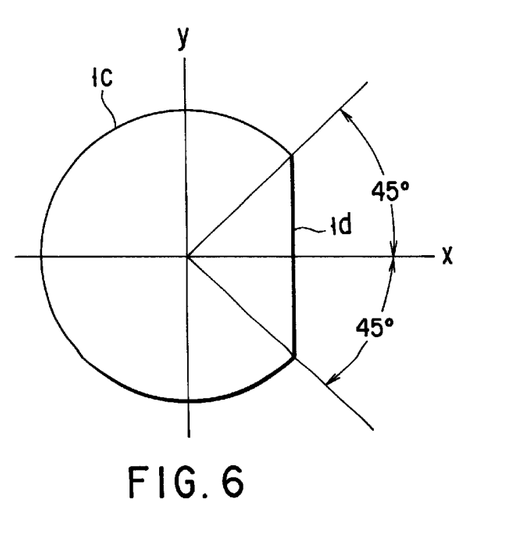
FIG. 6 is a bottom view of the mold shown in FIG. 5.

The resin pressing surface 1a of the mold 1 has a contour which is substantially similar to the contour of the shaped surface 2a of the glass base 2. Thus, the surface 1a has a contour defined by a superior arc 1c in a projection on the xy-plane perpendicular to the optical axis A and a chord 1d which connects the opposite ends of the arc 1c, as shown in FIG. 6. More specifically, the contour of the resin pressing surface 1a includes the superior arc 1c of 22-mm diameter, outside the upper and lower positive 45° regions with respect to the x-axis, and the chord 1d between the opposite ends of the arc 1c, inside the upper and lower positive 45° regions. In this case, the x-coordinate is about 7.78 mm long.

As shown in FIG. 5, the glass base 2 is located under the mold 1 so that its shaped surface 2a faces the resin pressing surface 1a, that the center of curvature of the surface 1a is situated on the optical axis A, and that the respective chords of the surfaces 1a and 2a are aligned.

Subsequently, a proper quantity of energy-curing resin, e.g., ultraviolet-curing resin 6, is fed onto the shaped surface 2a of the glass base 2. The quantity of supply of the resin 6 is previously obtained so that the resin 6 spreads all over the resin pressing surface 1a when it has a desired thickness.

Then, the mold 1 is gradually brought close to the glass base 2, and the resin 6 on the shaped surface 2a of the base 2 is spread in a space between the mold 1 and the base 2. When the distance between the mold 1 and the glass base 2 takes a desired value, the mold 1 is stopped from approaching the base 2. In this state, the resin 6 is spread all over the resin pressing surface 1a of the mold 1, so that an unset layer of the resin 6 is formed in the space between the surfaces 1a and 2a.

Thereafter, ultraviolet rays are applied to the unshaped surface 2b of the glass base 2, whereupon the unset layer of the resin 6 is set to form the resin layer 5. Thereafter, the mold 1 is separated from the resin layer 5, whereupon the optical element 7 is obtained as a finished product.

Since the resin pressing surface 1a of the mold 1 is a size smaller than the shaped surface 2a of the glass base 2, the formed resin layer 5 extends within the area of the surface 2a. As mentioned before, the straight portion of the layer 5 is at the distance of about 1 mm from the cut surface 2f of the glass base 2, while the arcuate portion is at the distance of 1.5 mm from the peripheral surface of the base 2.

Thus, the resin layer 5 is situated at a distance longer than 0.3 mm from the fine chips 2e at a line of intersection between the shaped surface 2a and the cut surface 2f of the glass base 2. As is generally known, fine chips that are produced by cutting exist within a range at a distance of 0.3 mm or less from the line of intersection between the shaped surface 2a and the cut surface 2f, so that deformation which is attributable to temperature change of a resin portion situated at a longer distance never exerts any substantial bad influence upon the fine chips.

As shown in FIGS. 1 and 2, the resin layer 5 extends within the area of the shaped surface 2a and is kept apart from the contour of the surface 2a. Thus, the layer 5 is not in contact with the fine chips 2e at the edge, on which the shaped surface 2a and the cut surface 2f of the glass base 2 meet each other. The heaviest stress is generated at the peripheral portion of the resin layer 5 due to deformation of the layer 5. Since the contour of the resin layer 5 is kept apart from the fine chips 2e, however, no substantial stress acts on the fine chips 2e. In consequence, the glass base 2 cannot be damaged by the deformation of the resin layer 5 which is attributable to temperature change. Thus, the optical element 7 has satisfactory durability.

Since a part of the optical element 7 that is not concerned in the optical performance is eliminated, moreover, the element 7 occupies a narrower space than a circular optical element does. The resulting spatial margin can be utilized for the arrangement of other optical components, so that a compact system can be obtained favorably.

According to the embodiment described above, the distance between the respective contours of the shaped surface 2a of the glass base 2 and the resin layer 5 is about 1.5 mm at the arcuate portion and about 1 mm at the straight portion. However, these values are only illustrative, and the present invention is not limited to them. According to the invention, it is necessary only that the contour of the resin layer 5 be kept at a distance, preferably at a distance longer than 0.3 mm, from the contour of the shaped surface 2a.

Figure 7:
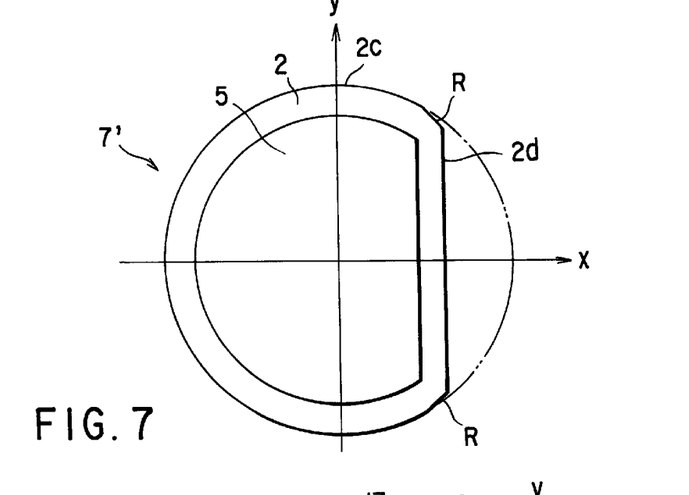
FIG. 7 is a plan view of a modification of the optical element according to the first embodiment.

In the drawings, the straight end face of the resin layer 5 shown to be a surface parallel to the cut surface 2f of the glass base 2. According to the present invention, however, the straight end face may be any other surface that is not in contact with the fine chips 2e, e.g., a flat surface inclined at an angle to the cut surface 2f or a curved surface. Various modifications may be effected in the present embodiment without departing from the scope or spirit of the invention. In an optical element 7' according to a modification shown in FIG. 7, for example, a glass base 2 has curved portions R at the points of intersection between an arc 2c and a chord 2d, whereby the contour of a shaped surface 2a is rounded. Having no edges on the periphery, the optical element 7' itself and other portions can be restrained from being damaged as they are handled.

SECOND EMBODIMENT

Figure 8:
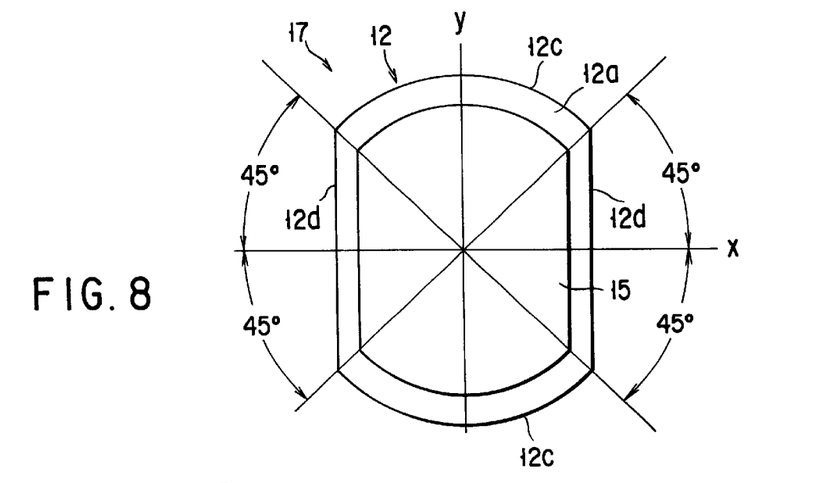
FIG. 8 is a plan view of an optical element according to a second embodiment, showing the respective contours of a shaped surface of a glass base and a resin layer.
Figure 9:
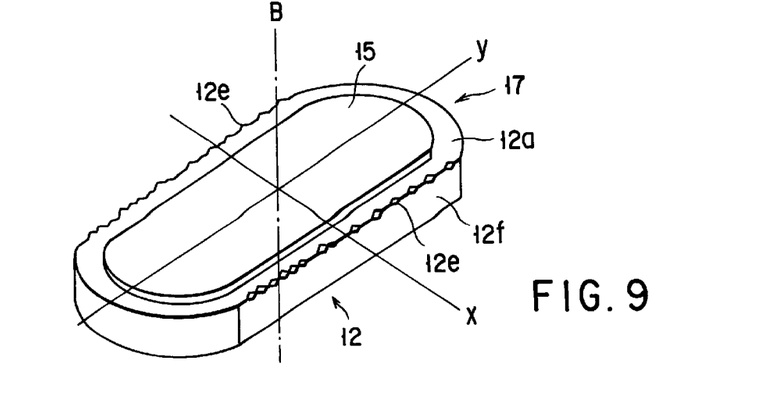
FIG. 9 is a perspective view of the optical element shown FIG. 8.

As shown in FIGS. 8 and 9, an optical element 17 is a composite lens, for example, which comprises a glass base 12 having a pair of optical surfaces 12a and 12b and a resin layer 15 formed on the optical surface 12a of the base 12.

The glass base 12 has an optical axis B, and the optical surface 12a of the base 12 has a contour which is asymmetrical in rotation about the axis B, as seen from FIG. 8. In other words, the optical surface 12a has a noncircular contour.

Figure 10:
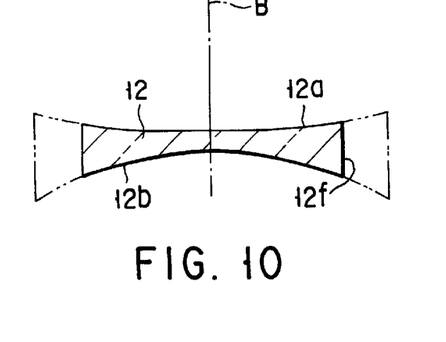
FIG. 10 is a side sectional view of a glass base simple shown in FIG. 9.

As seen from FIGS. 9 and 10, the optical surface 12a comprises a part of a concave surface, e.g., a spherical surface, with a curvature radius of, e.g., 100 mm. The surface 12a, herein, is referred to also as a shaped surface. Likewise, the optical surface 12b comprises a part of a concave surface, e.g., a spherical surface, with a curvature radius of, e.g., 50 mm. The surface 12b, herein, is referred to also as an unshaped surface. The glass base 12 has a center thickness of, e.g., 2 mm, that is, the distance between the concave surfaces 12a and 12b on the optical axis B is 2 mm.

As shown in FIG. 8, for example, the contour of the shaped surface 12a of the glass base 12 is defined by a pair of concentric arcs 12c in a projection on an xy-plane perpendicular to the optical axis B and a pair of chords 12d which connect the respective opposite ends of the arcs 12c. The two chords 12d have the same length and extend parallel to each other, for example.

More specifically, the contour of the shaped surface 12a includes the arcs 12c of 25-mm diameter, outside the upper and lower positive and negative 45° between the respective opposite ends of the arcs 12c, inside the upper and lower positive and negative 45° regions. The absolute x-coordinate value of each chord 12d is about 8.84 mm.

Figure 11:
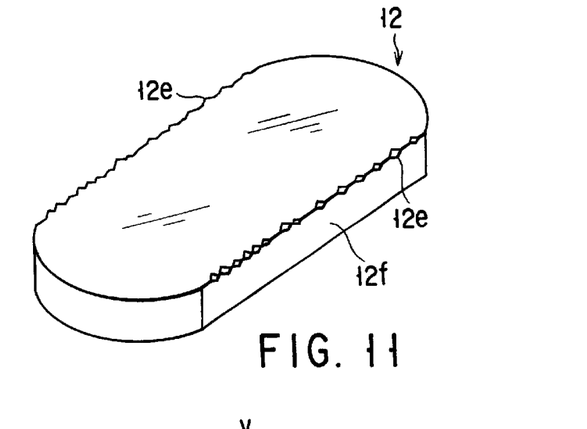
FIG. 11 is a perspective view of the glass base shown in FIG. 10.

The glass base 12 is made by cutting a part of a preformed glass material having a circular contour in the projection on the xy-plane perpendicular to the optical axis B. Cut portions are indicated by phantom lines in FIG. 10. As shown in FIG. 11, therefore, the glass base 12 has innumerable fine chips 12e at its edges, on which cut surfaces 12f and the shaped surface 12a meet one another.

Thus, the contour of the shaped surface 12a of the glass base 12 is defined by the original contour of the preformed glass material and the lines of intersection between the corresponding surface of the preformed glass material and the cut surfaces 12f.

The resin layer 15 extends on and within the shaped surface 12a of the glass base 12. The layer 15 has a contour which is kept apart from the fine chips 12e produced at the contour of the shaped surface 12a. Preferably, the contour of the resin layer 15 is substantially similar to that of the shaped surface 12a of the glass base 12. The distance between the respective contours of the shaped surface 12a of the glass base 12 and the resin layer 15 is preferably longer than 0.3 mm, e.g., about 1.5 mm at the arc portion and about 1 mm at each chord portion. The resin layer 15 is formed of energy-curing resin, e.g., ultraviolet-curing resin.

Figure 12:
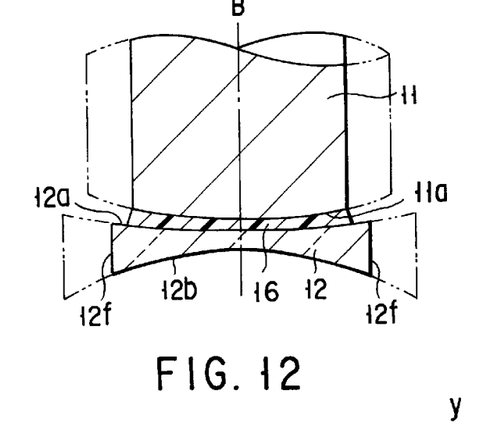
FIG. 12 is a partial side sectional view for illustrating a process for forming a resin layer on the glass base of FIG. 10 by means of a mold.

As shown in FIG. 12, the optical element 17 is manufactured by placing ultraviolet-curing resin 16 on the shaped surface 12a of the glass base 12, pressing a mold 11 against the resin 16 to spread the resin 16 all over a resin pressing surface 11a of the mold 11, and then applying ultraviolet rays to the resin 16 to set it. Since this process has already been described in connection with the first embodiment, a repeated description will be omitted. The following is a description of only the resin pressing surface 11a of the mold 11, a difference from the first embodiment.

Figure 13:
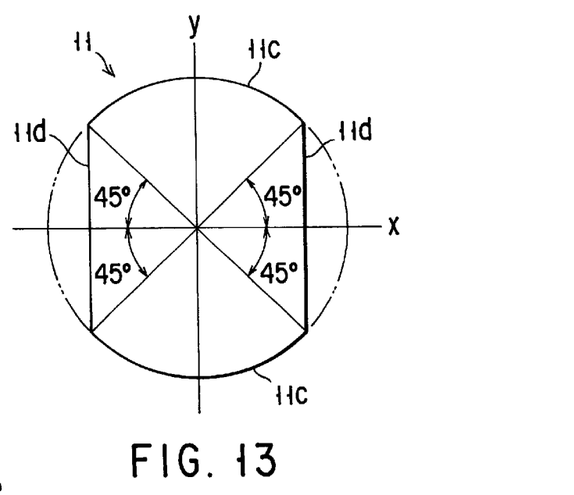
FIG. 13 is a bottom view of the mold shown in FIG. 12.

The resin pressing surface 11a of the mold 11 has a contour which is substantially similar to the contour of the shaped surface 12a of the glass base 12. Thus, the surface 11a is defined by a pair of concentric arcs 11c in a projection on the xy-plane perpendicular to the optical axis B and a pair of chords 11d which connect the respective opposite ends of the arcs 11c, as shown in FIG. 13. The two chords 11d have the same length and extend parallel to each other.

More specifically, the contour of the resin pressing surface 11a includes the arcs 11c of 22-mm diameter, outside the upper and lower positive and negative 45° regions with respect to the x-axis, and the chords 11d between the respective opposite ends of the arcs 11c, inside the upper and lower positive and negative 45° regions. The absolute x-coordinate value of each chord 11d is about 7.78 mm.

As shown in FIGS. 8 and 9, the resin layer 15 extends within the area of the shaped surface 12a and is kept apart from the contour of the surface 12a. Thus, the layer 15 is not in contact with the fine chips 12e at the respective edges, on which the shaped surface 12a and the cut surfaces 12f of the glass base 12 meet each other, respectively. The heaviest stress is generated at the peripheral portion of the resin layer 15 due to deformation of the layer 15. Since the contour of the resin layer 15 is kept apart from the fine chips 12e, however, no substantial stress acts on the fine chips 12e. In consequence, the glass base 12 cannot be damaged by the deformation of the resin layer 15 which is attributable to temperature change. Thus, the optical element 17 has satisfactory durability.

Since a part of the optical element 17 that is not concerned in the optical performance is eliminated, moreover, the element 17 occupies a narrower space than a circular optical element does. The resulting spatial margin can be utilized for the arrangement of other optical components, so that a compact system can be obtained favorably.

Since the optical element 17 has a shape symmetrical with respect to the x- and y-axes, moreover, it can be mounted without orienting its components in an assembly process. Thus, the operating efficiency of the assembly process can be improved advantageously.

Various changes may be effected in the present embodiment without departing from the scope or spirit of the invention. As in the case of the modification (see FIG. 7) of the first embodiment, for example, the glass base 12 may be formed having curved portions at the points of intersection between the arc 12c and the chord 2d, in order to round the shaped surface 12a.

Figure 14:
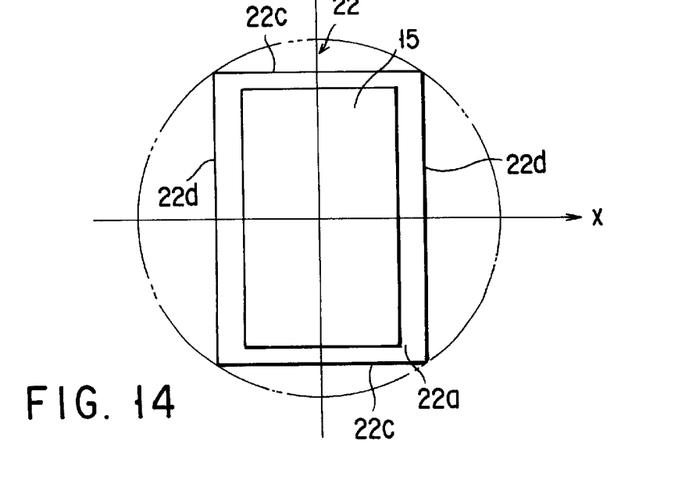
FIG. 14 is a plan view of a modification of the optical element according to the second embodiment.

In a modification shown in FIG. 14, the contour of a shaped surface 22a of a glass base 22 is defined by a pair of first segments 22c in a projection on an xy-plane perpendicular to the optical axis and a pair of second segments 22d which connect the respective opposite ends of the first segments 22c. Although the first segments 22c shown in FIG. 14 are parallel to each other, for example, they need not always be so. Although the second segments 22d are parallel to each other, for example, they need not always be so, either. Although the segments 22c are located at equal distances from the optical axis, moreover, they may alternatively be situated at different distances from the optical axis. Although the segments 22d are located at equal distances from the optical axis, they may also be situated at different distances from the optical axis. Although the first and second segments 22c and 22d extend at right angles to one another, they need not always do so.

Figures 15, 16, 17, 18:
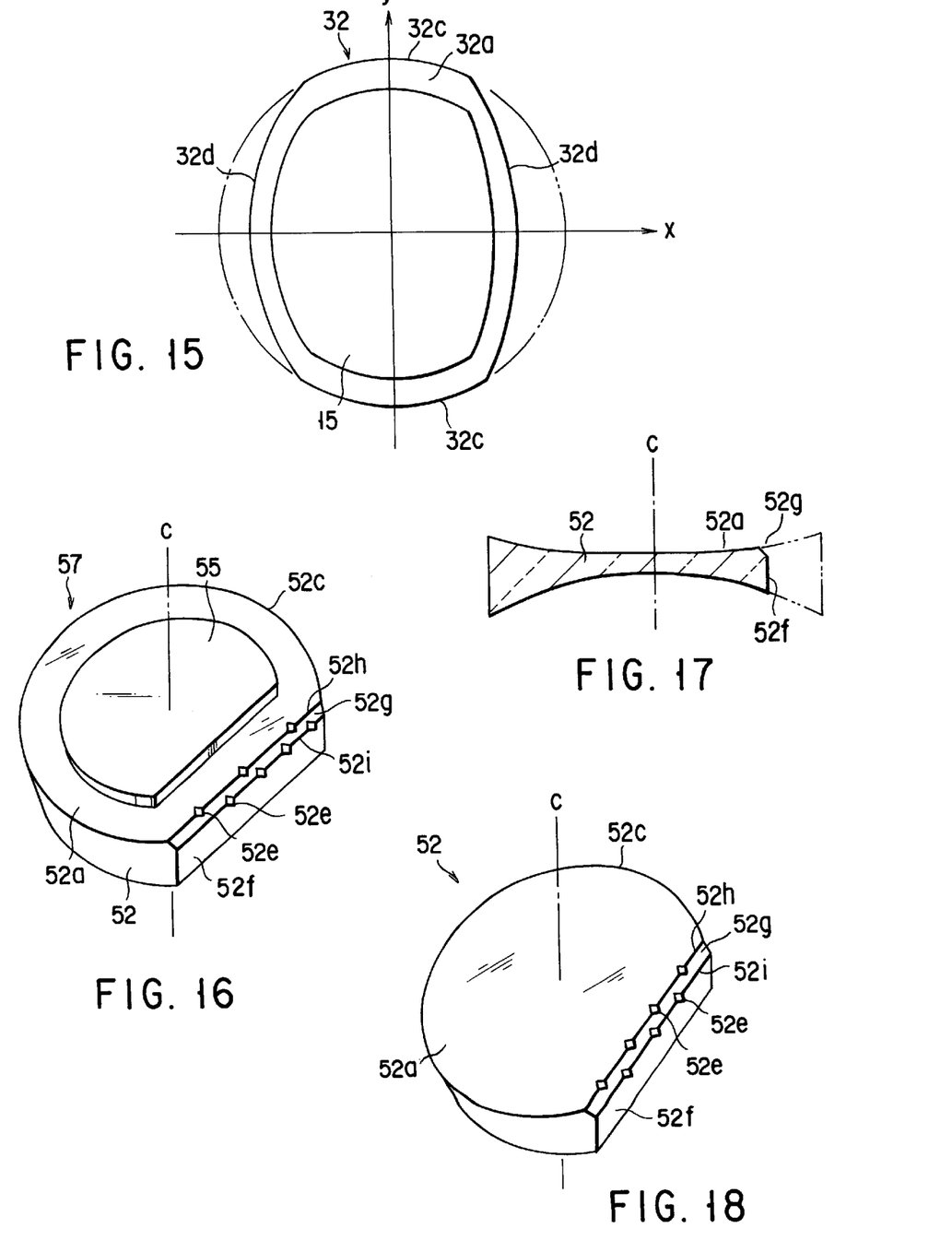
FIG. 15 is a plan view of another modification of the optical element according to the second embodiment.
FIG. 16 is a perspective view of an optical element according to a third embodiment.
FIG. 17 is a side sectional view of a glass base used in the optical element according to the third embodiment.
FIG. 18 is a perspective view of the glass base shown in FIG. 17.

In another modification shown in FIG. 15, the contour of a shaped surface 32a of a glass base 32 is defined by a pair of concentric first arcs 32c in a projection on a plane perpendicular to the optical axis and a pair of second arcs 32d which connect the respective opposite ends of the first arcs 32c, the second arcs 32d having a diameter larger than that of the first arcs 32c. Although the first arcs 32c shown in FIG. 15 have the same length, for example, they may alternatively have different lengths. Although the second arcs 32d shown in FIG. 15 have their respective centers, they may alternatively be concentric.

THIRD EMBODIMENT

As shown in FIG. 16, an optical element 57 is a composite lens, for example, which comprises a glass base 52 and a resin layer 55 formed on a shaped surface 52a of the base 52. The glass base 52, which resembles the glass base according to the first embodiment, is further provided with a chamfer portion 52g.

The glass base 52 is made by partially cutting a preformed glass material having a circular contour in a projection on a plane perpendicular to an optical axis C, and further chamfering an edge between a cut surface 52f and that surface of the preformed glass material which corresponds to the shaped surface 52a of the glass base 52. For example, the chamfer portion 52g is inclined at an angle of 45° to the cut surface 52f and is about 0.3 mm wide. A portion removed from the preformed glass material is indicated by phantom line in FIG. 17. As shown in FIG. 18, therefore, the glass base 52 has innumerable fine chips 52e at an edge 52h, on which the chamfer portion 52g and the shaped surface 52a meet each other, and an edge 52i, on which the chamfer portion 52g and the cut surface 52f meet each other.

The glass base 52 has the optical axis C, and the shaped surface 52a of the base 52 has a contour which is asymmetrical in rotation about the axis C. In other words, the shaped surface 52a has a noncircular contour. More specifically, the contour of the shaped surface 52a of the glass base 52 is defined by a superior arc 52c and a chord 52h which connects the opposite ends of the arc 52c. In other words, the contour of the shaped surface 52a is defined by the original contour 52c of the preformed glass material and the line 52h of intersection between the corresponding surface 52a of the preformed glass material and the chamfer portion 52g.

The resin layer 55 extends on and within the shaped surface 52a of the glass base 52 and has a contour which is kept apart from the fine chips 52e produced at the contour of the surface 52a. Preferably, the contour of the resin layer 55 is substantially similar to that of the shaped surface 52a. Preferably, moreover, the distance between the respective contours of the shaped surface 52a of the glass base 52 and the resin layer 55 is longer than 0.3 mm, e.g., about 1.5 mm at the arc portion and about 1 mm at the chord portion. The resin layer 55 is formed in the same manner as the one according to the first embodiment.

As seen from the above description, the resin layer 55 extends within the area of the shaped surface 52a and is kept apart from the fine chips 52e produced at the contour of the surface 52a. Thus, the layer 55 is not in contact with the fine chips 52e at the edge 52h of the glass base 52. Accordingly, stress which is generated as the resin layer 55 is deformed never substantially acts on the fine chips 52e, so that the glass base 52 cannot be damaged by the deformation of the layer 55 which is attributable to temperature change. In consequence, the optical element 57 enjoys satisfactory durability.

Since a part of the optical element 57 that is not concerned in the optical performance is eliminated, moreover, the element 57 occupies a narrower space than a circular optical element does. Therefore, the optical element 57 provides an additional space that can be utilized for the arrangement of other optical components, so that the system that incorporates these components can be favorably made compact.

Since the optical element 57 has the chamfer portion 52g on the edge between the shaped surface 52a and the cut surface 52f of the glass base 52, moreover, sharp edges are reduced. Accordingly, damage to the optical element itself and other portions can be restrained as they are handled. Further, the formation of the chamfer portion 52g can provide an additional space for the arrangement of other components.

Although the glass base 52 according to the present embodiment has the chamfer portion 52g of about 0.3-mm width inclined at 45° to the cut surface 52f, the invention is not limited to these numerical values at all. According to the invention, it is necessary only that the resin layer 55 be not in contact with the fine chips at the edge 52h between the shaped surface 52a and the chamfer portion 52g, and the shape of the chamfer portion 52g, as well as the inclination and width thereof, can be selected as required.

Furthermore, the glass base may be provided with two or more chamfer portions. Thus, chamfer portions may be formed on a rectangular glass base shown in FIG. 14, for example, or any other polygonal glass bases.

FOURTH EMBODIMENT

Figure 19:
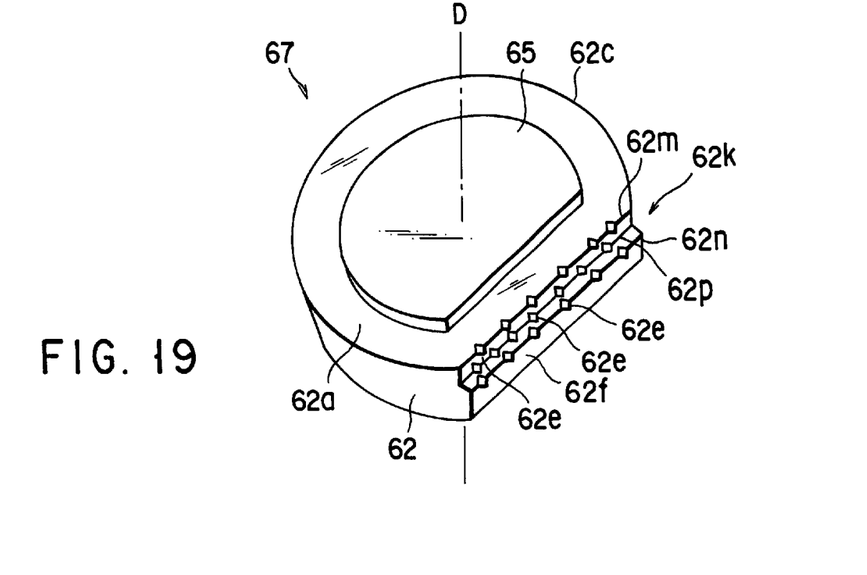
FIG. 19 is a perspective view of an optical element according to a fourth embodiment.

As shown in FIG. 19, an optical element 67 is a composite lens, for example, which comprises a glass base 62 and a resin layer 65 formed on an shaped surface 62a of the base 62. The glass base 62, which resembles the glass base according to the first embodiment, is further provided with a step portion 62k.

Figure 20:
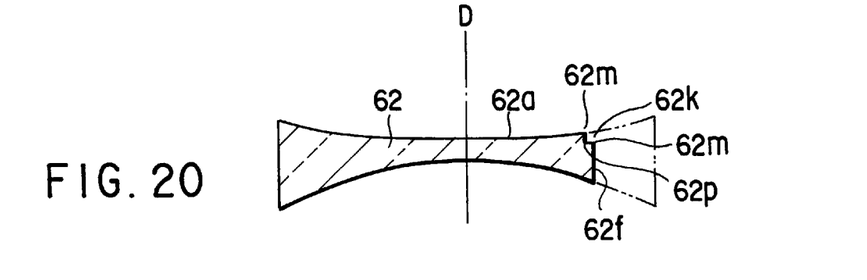
FIG. 20 is a sectional view of a glass base used in the optical element according to the fourth embodiment.
Figure 21:
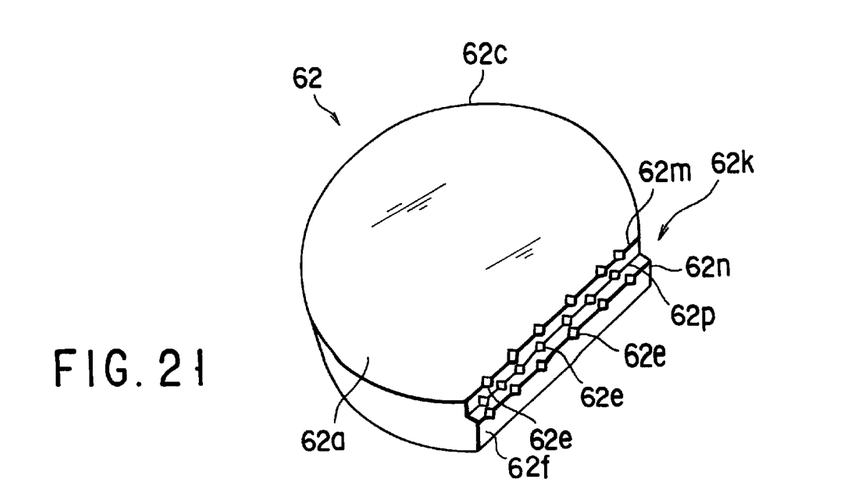
FIG. 21 is a perspective view of the glass base shown in FIG. 20.

The glass base 62 is made by partially cutting a preformed glass material having a circular contour in a projection on a plane perpendicular to an optical axis D, and further forming the step portion 62k on an edge between a cut surface 62f and that surface of the preformed glass material which corresponds to the shaped surface 62a of the glass base 62. For example, the step portion 62k is about 0.3 mm deep and about 0.3 mm wide. A portion removed from the preformed glass material is indicated by phantom line in FIG. 20. As shown in FIG. 21, therefore, the glass base 62 has innumerable fine chips 62e at two outer edges 62m and 62n and one inner edge 62p, which are defined by the step portion 62k.

The glass base 62 has the optical axis D, and the shaped surface 62a of the base 62 has a contour which is asymmetrical in rotation about the axis D. In other words, the shaped surface 62a has a noncircular contour. More specifically, the contour of the shaped surface 62a of the glass base 62 is defined by a superior arc 62c and a chord 62m which connects the opposite ends of the arc 62c. In other words, the contour of the shaped surface 62a is defined by the original contour 62c of the preformed glass material and the edge 62m or the line of intersection between the corresponding surface 62a of the preformed glass material and the step portion 62k.

The resin layer 65 extends on and within the shaped surface 62a of the glass base 62 and has a contour which is kept apart from the fine chips 62e produced at the contour of the surface 62a. Preferably, the contour of the resin layer 65 is substantially similar to that of the shaped surface 62a. Preferably, moreover, the distance between the respective contours of the shaped surface 62a of the glass base 62 and the resin layer 65 is longer than 0.3 mm, e.g., about 1.5 mm at the arc portion and about 1 mm at the chord portion. The resin layer 65 is formed in the same manner as the one according to the first embodiment.

As seen from the above description, the resin layer 65 extends within the area of the shaped surface 62a and is kept apart from the contour of the surface 62a. Thus, the layer 65 is not in contact with the fine chips 62e at the edge 62m of the glass base 62. Accordingly, stress which is generated as the resin layer 65 is deformed never substantially acts on the fine chips 62e, so that the glass base 62 cannot be damaged by the deformation of the layer 65 which is attributable to temperature change. In consequence, the optical element 67 enjoys satisfactory durability.

Since a part of the optical element 67 that is not concerned in the optical performance is eliminated, moreover, the element 67 occupies a narrower space than a circular optical element does. Therefore, the optical element 67 provides an additional space that can be utilized for the arrangement of other optical components, so that the system that incorporates these components can be favorably made compact.

Further, the optical element 67 has the step portion 62k on the edge between the shaped surface 62a and the cut surface 62f of the glass base 62, which can provide an additional space for the arrangement of other components.

Although the glass base 62 according to the present embodiment has the step portion 62k of 0.3-mm depth and width, the invention is not limited to these numerical values at all. According to the invention, it is necessary only that the resin layer 65 be not in contact with the fine chips at the edge 62m between the shaped surface 62a and the step portion 62k, and the shape of the step portion 62k, as well as the inclination and width thereof, can be selected as required.

Furthermore, the glass base may be provided with two or more step portions. Thus, step portions may be formed on a rectangular glass base shown in FIG. 14, for example, or any other polygonal glass bases.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical element comprising:
   a glass base having one surface; and
   a resin layer formed on the one surface of the glass base, the glass base having an optical axis such that the one surface of the glass base has a contour asymmetrical in rotation about the optical axis, and
   the resin layer extending within the one surface of the glass base and having a contour kept apart from fine chips at the contour of the one surface of the glass base.

2. An optical element according to claim 1, wherein the contour of said resin layer is substantially similar to the contour of the one surface of the glass base.

3. An optical element according to claim 1, wherein the distance between the respective contours of the one surface of the glass base and the resin layer is longer than 0.3 mm.

4. An optical element according to claim 1, wherein the contour of the one surface of said glass base is defined by a superior arc in a projection on a plane perpendicular to the optical axis and a chord connecting the opposite ends of the arc.

5. An optical element according to claim 1, wherein the contour of the one surface of said glass base is defined by a pair of concentric arcs in a projection on a plane perpendicular to the optical axis and a pair of chords connecting the respective opposite ends of the arcs.

6. An optical element according to claim 5, wherein said pair of chords extend parallel to each other.

7. An optical element according to claim 6, wherein said pair of chords have the same length.

8. An optical element according to claim 1, wherein the contour of the one surface of said glass base is defined by a pair of first segments in a projection on a plane perpendicular to the optical axis and a pair of second segments connecting the respective opposite ends of the first segments.

9. An optical element according to claim 8, wherein said pair of first segments extend parallel to each other.

10. An optical element according to claim 9, wherein said pair of second segments extend parallel to each other.

11. An optical element according to claim 10, wherein said pair of first segments are located at equal distances from the optical axis.

12. An optical element according to claim 11, wherein said pair of second segments are located at equal distances from the optical axis.

13. An optical element according to claim 12, wherein said first and second segments extend at right angles to one another.

14. An optical element according to claim 1, wherein the contour of the one surface of said glass base is defined by a pair of concentric first arcs in a projection on a plane perpendicular to the optical axis and a pair of second arcs connecting the respective opposite ends of the first arcs, the second arcs having a diameter larger than that of the first arcs.

15. An optical element according to claim 14, wherein said pair of first arcs have the same length.

16. An optical element according to claim 15, wherein said pair of second arcs are concentric with each other.

17. An optical element according to claim 1, wherein said glass base includes curved portions for the roundness of the contour of the one surface of the glass base.

18. An optical element according to claim 1, wherein said glass base is made by partially cutting a preformed glass material having a circular contour in a projection on a plane perpendicular to an optical axis so that the contour of the one surface of the glass base is defined by the original contour of the preformed glass material and the line of intersection between the corresponding surface of the preformed glass material and a cut surface.

19. An optical element according to claim 1, wherein said glass base is made by partially cutting a preformed glass material having a circular contour in a projection on a plane perpendicular to an optical axis and further chamfering an edge between a cut surface and that surface of the preformed glass material which corresponds to the one surface of the glass base so that the contour of the one surface of the glass base is defined by the original contour of the preformed glass material and the line of intersection between the corresponding surface of the preformed glass material and a chamfer portion, whereby the contour of said resin layer is kept apart form the fine chips at the intersection line.

20. An optical element according to claim 1, wherein said glass base is made by partially cutting a preformed glass material having a circular contour in a projection on a plane perpendicular to an optical axis and further forming a step portion on an edge between a cut surface and that surface of the preformed glass material which corresponds to the one surface of the glass base so that the contour of the one surface of the glass base is defined by the original contour of the preformed glass material and the line of intersection between the corresponding surface of the preformed glass material and the step portion, whereby the contour of said resin layer is kept apart form the fine chips at the intersection line.

* * * * *